_United States Patent Office_ 3,250,747
Patented May 10, 1966

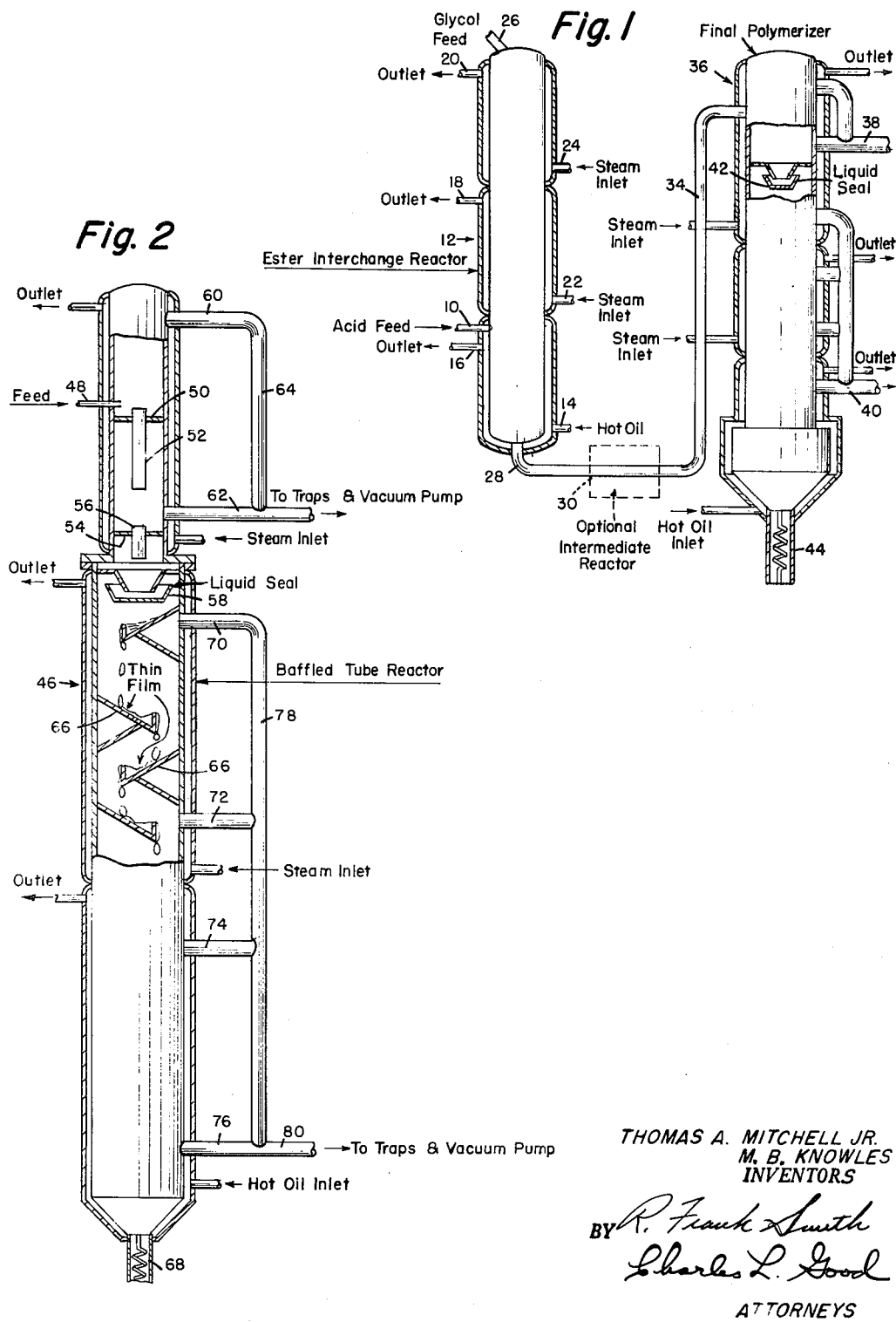

3,250,747
POLYESTERIFICATION IN TWO EVACUATED ZONES SEPARATED BY A LIQUID SEAL
Thomas A. Mitchell, Jr., and M B Knowles, Kingsport, Tenn., assignors to Eastman Kodak Company, Rochester, N.Y., a corporation of New Jersey
Filed Dec. 7, 1961, Ser. No. 157,786
9 Claims. (Cl. 260—75)

This invention relates to a process and apparatus for the production of linear polyesters prepared from intermediate ester products of one or more dicarboxylic acids or their esters and one or more glycols, e.g., poly(alkanediol terephthalates). It relates to polymerization apparatus having two vacuum systems separated by a liquid seal.

Fiber and film-forming polymers prepared from dimethyl terephthalate and 1,4-cyclohexanedimethanol, ethylene glycol, etc., are conventionally prepared in a plurality of reactors, the first reactor being used for the preparation of an intermediate molecular weight "prepolymer" and one or more additional reactors being used for the further polymerization to a polymer of higher molecular weight. Quite often considerable difficulty is encountered due to the vigorous reaction between the dicarboxylic acid or its ester and the ethylene glycol, 1,4-cyclohexanedimethanol or the like in the prepolymerization step with the resultant solidification of the ester-interchange product. Also, in the final polymerization stage, various problems have arisen which have not yet been completely solved. For example, in the final polymerization process using a liquid phase it is necessary to maintain the material undergoing polymerization in a thin film so as to constantly renew the surface area. Stirred reactors of the prior art are generally unable to maintain a film of the desired thinness. The moving parts of such a stirred reactor require special seals which are difficult to maintain in a leak-proof condition. Efforts to provide for the proper build-up of the polymer and the removal of excess glycol have heretofore met with much difficulty. Exemplary of prior art efforts attempting to achieve optimum results are U.S. 2,727,882, U.S. 2,758,915, U.S. 2,933,476, British 823,-100, French 1,197,720, German D.A.S. 1,012,459, Japanese utility model publication No. 16,930/60, Swiss 237,400, and many others. Additional prior art disclosing apparatus for removing vaporizable substances includes U.S. 2,498,752, U.S. 2,500,934, U.S. 2,509,172, U.S. 2,539,699, U.S. 2,645,607, U.S. 2,790,796, and many others. After extended investigation we have invented a process and apparatus for the production of a polyester which will substantially eliminate many of the preceding difficulties encountered in the prior art.

Accordingly, it is an object of this invention to provide a simplified and improved process and apparatus for the production of polyesters. Further objects will appear hereinafter.

According to a preferred embodiment of this invention there is provided a continuous process for the further polymerization of an intermediate molecular weight ester condensation product of (1) a dicarboxylic constituent and (2) an alkanediol wherein said molecular weight is being increased by elimination of small amounts of said alkanediol by vaporization and evacuation at an elevated temperature and at a low pressure while said ester condensation product as a liquid flows downwardly through an upper polymerization zone at one pressure into and through a lower polymerization zone at a lower pressure, said ester condensation product at first having an inherent viscosity measured in a solution of 40% tetrachloroethane +60% phenol of from about 0.05 to about 0.4, said further polymerization process comprising (a) feeding said intermediate polyester liquid into a substantially horizontal receptacle in said first zone equipped with overflow means leading to a lower receptacle in said first zone which is similarly equipped, (b) overflowing said liquid from one receptacle to the next, all of said receptacles being at a substantially uniform low upper zone pressure of less than 5 cm. of Hg pressure and being gaseously interconnected, (c) flowing said liquid from the lowermost receptacle in said first zone into a downwardly leading conduit within which the liquid level is maintained at a higher level than in the uppermost receptacle in said lower zone into which said conduit protrudes, (d) overflowing said polyester from said uppermost receptacle in said lower zone over a series of evaporative surfaces mounted in said lower zone whereby liquid polyester flows as a thin film across the major portion of each surface and drops therefrom upon the next following surface below, all of said surfaces being at a substantially uniformly low lower zone pressure and being gaseously interconnected, (e) flowing said polyester from the lowermost evaporative surface to means for removal from said lower zone, whereby built-up polyester being removed has an inherent viscosity at least 0.2 greater than that of the intermediate molecular weight ester condensation product being fed into the upper zone, and (f) maintaining a pressure differential between said upper and lower zones.

Thus, we have found that in preparing polyesters, the final polymerization reactor should contain at least two vacuum systems separated by a liquid seal. The polymerization reactor of our invention advantageously contains a series of baffles or equivalent surfaces over which the material to be polymerized flows by gravity alone in a thin layer, the glycol (alkanediol) being given off and removed through an exhaust system. The reactor is mounted vertically.

A more complete understanding of our invention will be had from an examination of the following detailed description and drawing.

In the drawing:

FIG. 1 is a simplified representation of condensation equipment, a part of which is covered by this invention.

FIG. 2 is a semi-schematic drawing of a preferred embodiment of the polymerization apparatus covered by this invention in which the inventive process is accomplished.

Referring first to FIG. 1, the dicarboxylic acid or preferably an ester thereof together with a catalyst is led through line 10 into an ester interchange reactor 12, the bottom portion of which is heated with hot oil or its equivalent which enters at line 14, circulating and leaving through line 16, and the upper two portions heated by steam or its equivalent which enters at lines 22 and 24 and leaves at lines 18 and 20. The glycol is pumped into the top of the reactor through line 26. The transesterification product is removed from the bottom of the reactor through line 28 and may be optionally conducted through a separate intermediate reactor 30, if desired (similar to reactor 12), prior to being conducted via line 34 to the final polymerization build-up reactor 36. Excess glycol is removed from the upper portion of the reactor 36 through vacuum trap line 38 and from the bottom portion through vacuum trap line 40, the lower portion of said reactor 38 being separated from upper portion by a liquid seal 42. The polymer produced in the polymerization reactor may be removed at the bottom thereof by means of extruder screw 44.

Referring now to FIG. 2, material consisting primarily of a prepolymer enters polymerization reactor 46 at line 48 onto a tray 50 which contains a constant level overflow standpipe 52. The material leaving tray 50 drops onto a second tray 54, which also has a standpipe 56 and then passes through the liquid seal 58. The trays above the seal are maintained at reduced pressure, normally 0.5–2.0 mm. of mercury, by means of any suitable vacuum pumps or ejectors (not shown) connected via lines 60, 62 and 64. Vapors are removed through a header and are condensed by means of heat exchangers or cold traps (not shown).

The feed material is preferably an intermediate molecular weight polyester which may include some low molecular weight constituents having as few as 4 repeating units; however, the feed will have an average molecular weight of from about 2,000 to about 7,000, as conveniently calculated from the corresponding inherent viscosities. This feed can advantageously be the ester interchange product made by reacting a diester, such as dimethyl terephthalate, and a glycol or glycols such as 1,4 - cyclohexanedimethanol, ethylene glycol, poly(tetramethylene glycol), 2,2,4,4 - tetramethyl - 1,3 - cyclobutanediol, etc. In the top section of the final polymerizer 46, excess glycol is removed through the vacuum trap lines 60, 62 and 64, and the molecular weight of the polyester is increased, as measured by inherent viscosity. Normally the feed material has an inherent viscosity of less than 0.3 or it can even be too low to warrant measurement, e.g. 0.05 or less, but by the time it moves downward and on through the seal 58 it has an inherent viscosity of about 0.35–0.45. The process is carried out in the upper zone in such a way that the polymer passing through the seal has a melt viscosity sufficiently high so that it does not flow over the plurality of baffle plates 66 too rapidly. The viscosity gradually increases as the liquid moves downward.

After the polymeric material passes through the liquid seal 58, it drops onto the first of the plurality of baffle plates 66. These plates can be practically horizontal and need not have the lip shown in the drawing. The polymeric material flows across the first plate, drops onto the second, and so on until it reaches the bottom where it is pumped out of the reactor at line 68. This bottom section is operated at a reduced pressure, maintained in vacuum trap lines 70, 72, 74, 76, 78, and 80. The pressure in the lower zone must be lower than that in the upper zone (above the seal) for the material to flow through the seal. Since the polymeric material passing through the seal advantageously has an inherent viscosity of approximately 0.5, very little glycol has to be removed for an inherent viscosity increase to the desired value. For example 1 to 2% of glycol, based on weight of product, may be removed in the lower zone. Since only small quantities of glycol are removed as vapors, it is easy to maintain a low pressure, usually 0.05–0.5 mm. of mercury, which is advantageous for fast reaction rates and for high molecular weights. The entire polymerizer may be heated by circulating a heat transfer agent through a jacket. Rather than using an external vacuum trap system such as that shown in FIG. 2, an axially positioned central tube may be used. Due to its location the latter may be kept sufficiently hot to prevent possible plugging of the line by solidifying of excess glycol being drawn off.

This invention can be further illustrated by the following examples of preferred embodiments thereof although it will be understood that these examples are included merely for purposes of illustration and are not intended to limit the scope of the invention unless otherwise specifically indicated:

EXAMPLE 1. — PREPARATION OF POLYESTER FROM DIMETHYL TEREPHTHALATE AND 1,4-CYCLOHEXANEDIMETHANOL

Dimethyl terephthalate (1 mole) and 1,4 - cyclohexanedimethanol (1.1 mole) were mixed and continuously fed along with a titanium catalyst to an ester interchange column such as the prepolymerizer shown in FIG. 1. The column was heated by means of oil which was maintained at 300° C. The mixture of ester and glycol was fed at the rate of 10 lbs. per hour and the pressure in the column was maintained at 40 p.s.i. by venting part of the methanol. The abbreviation p.s.i. as used herein refers to pounds per square inch gauge. Under these conditions the methanol distilled from the column did not contain any dimethyl terephthalate or 1,4-cyclohexanedimethanol. When the feed rate was increased to 18–20 lbs. per hour, the pressure in the column was raised to 60–70 p.s.i. The feed from this column was pumped into a polymerizer such as that shown in FIG. 1 or FIG. 2, wherein the final polymer was formed.

EXAMPLE 2. — PREPARATION OF POLYESTER FROM DIMETHYL TEREPHTHALATE, DIBUTYL GLUTARATE, AND 1,4-CYCLOHEXANEDIMETHANOL

A similar reaction was carried out as in Example 1 except that the feed consisted of dimethyl terephthalate (0.75 mole) dibutyl glutarate (0.25 mole) and 1,4 - cyclohexanedimethanol (1.1 mole). This mixture was fed at a rate of 20 lbs. per hour into a column operated at 290° C. and under 60–70 p.s.i. The catalyst which was also continuously fed into the reactor consisted of a solution of titanium isopropoxide in methanol. The final polymer was collected from the baffled polymerization reactor.

EXAMPLE 3. — PREPARATION OF POLYESTER FROM DIMETHYL TEREPHTHALATE, DIBUTYL ISOPHTHALATE AND 1,4 - CYCLOHEXANEDIMETHANOL

A reaction was carried out as in Example 2, including the collection of the final polymer, except that the feed consisted of a mixture of dimethyl terephthalate (0.83 mole), dibutyl isophthalate (0.17 mole) and 1,4-cyclohexanedimethanol (1.1 mole).

EXAMPLE 4. — PREPARATION OF POLYESTER FROM DIMETHYL TEREPHTHALATE AND ETHYLENE GLYCOL

A reaction was carried out in the same manner as described in Example 1 except that the feed consisted of dimethyl terephthalate (1 mole) and ethylene glycol (1.3 mole). This mixture was fed at a rate of 15 lb. per hour into a column operated at 270–275° C. and under 60–70 p.s.i. The prepolymer was conducted to a baffled polymerization chamber and the polymerization completed therein.

Similar polyesters can be prepared using dialkyl (1–4 carbons) esters of 4,4'-diphenic acid, 2,6-dicarboxynapthalene, bis(4-carboxyphenyl) methane, etc.

The surprising advantage of the use of our two zone baffle plate polymerization reactor for the polymerization of the prepolymer is illustrated in Examples 5, 6 and 7.

EXAMPLE 5

The final polymerizer as shown in FIG. 2 was fed with a polyester prepared from dimethyl terephthalate and 1,4-cyclohexanedimethanol. The feed contained 30% excess 1,4-cyclohexanedimethanol and had an inherent viscosity of less than 0.10. The temperature of the circulating oil was maintained at 305° C. While feeding so that 17.5 lb./hr. of product was obtained, the section above the seal was operated at 1–2 mm. of mercury pressure and the section below the seal at a pressure of 0.05–0.10 mm. of mercury. The product had an inherent viscosity of 0.85 and the contact time was approximately 45 minutes. When the vacuum pumps on the top section were shut off and the pressure rose to 5 mm. of mercury above the seal and 0.20 mm. below the seal, the inherent viscosity dropped to 0.78.

EXAMPLE 6

The final polymerizer as in FIG. 2 was fed with a low molecular weight polyester prepared from dimethyl terephthalate and ethylene glycol, using 100% molar excess of glycol, at a rate of 23 lb./hr. and at a temperature of 285° C. An inherent viscosity of 0.75–0.80 was obtained when the pressures above and below the liquid seal were 1.5 mm. and 0.20 mm. of mercury, respectively. When the top vacuum pumps were turned off, the top pressure rose to about 5 mm. and the bottom to about 0.35 mm. The inherent viscosity dropped to 0.68.

EXAMPLE 7

The final polymerizer as in FIG. 2 was fed with a low molecular weight polyester prepared from 83 mole percent of dimethyl terephthalate, 17 mole percent of dimethyl isophthalate, and 1,4-cyclohexanedimethanol at a rate 85 lb./hr. and a temperature of 300° C. An inherent viscosity of 0.87–0.90 was obtained when the pressures above and below the seal were 2.0 mm. and 0.5 mm., respectively. The pressure above the seal was allowed to rise to about 5.0 mm., at which pressure the seal was broken, and the inherent viscosity dropped to 0.80–0.82.

The following example demonstrates the lower inherent viscosity and the lesser degree of polymerization ordinarily encountered when using a stirred, batch reactor.

A number of 5–10 lb. runs were made in a jacketed, stirred vessel of approximately 5 gal. volume. The vessel was vertically mounted, cone-shaped, and contained a sigma-type agitator. In each run the reactants were dimethyl terephthalate and 1,4-cyclohexanedimethanol plus a catalyst. After the initial ester interchange reaction was over, as evidenced by no more methanol being given off, the temperature was raised to 300° C. and the pressure gradually reduced to about 0.10 mm. Various polymerization times of from 0.5–3.0 hr. were tried. In none of the runs was an inherent viscosity greater than 0.75 obtained. The conditions maintained were identical to those used in Example 5 where an inherent viscosity of 0.85 was obtained in a shorter time.

The following table gives the operation temperature, the product rate in pounds per hour and the intrinsic viscosity of the polymer produced in several runs wherein an ester-interchange and polymerization apparatus such as that indicated in FIG. 1 was used. Some of the product was spun into yarn directly from the polymerization reactor and some made into film directly from the polymerization reactor. Where either yarn or film was produced, the table so indicates. In the table that follows the following designations are used:

A—Polyester made from 1,4-cyclohexanedimethanol and dimethyl terephthalate.
B—Polyester "A" modified with 17 mole percent of isophthalic acid.
C—Polyester "A" modified with 25 mole percent of succinic acid.
D—Polyester "A" modified with 40 mole percent of sebacic acid.
E—Polyester made from ethylene glycol and dimethyl terephthalate.
I.V.—Inherent viscosity determined in 40% tetrachloroethane-60%-phenol solution at 25° C.

Table

| Polyester Prepared | Product rate, Lb./Hr. | Temp., ° C. | I.V. |
|---|---|---|---|
| A | 4 | 310 | 0.61–0.63 |
| A | 7.2 | 310 | 0.50–0.53 |
| A | 10 | 315 | 0.49–0.54 |
| A | 10 | 305 | 0.67–0.70 |
| A | 8 | 310–320 | 0.55 |
| A | 8 | 305 | 0.88–0.76 |
| B[1] | 7 | 302 | 0.76–0.83 |
| A[1] | 7 | 305 | 0.72–0.74 |
| A[2] | 6 | 307 | 0.54–0.58 |
| A[2] | 6 | 304 | 0.65–0.68 |
| A | 7 | 305 | 0.70 |
| A | 10 | 305 | 0.62 |
| A | 13 | 305 | 0.53 |
| A | 11 | 308–320 | 0.70–0.80 |
| A | 13 | 308 | 0.70–0.80 |
| A[1] | 17 | 308 | 0.70–0.80 |
| A | 21 | 308 | 0.70–0.77 |
| B[2] | 20 | 303 | 0.75–0.85 |
| C | 20 | 285–300 | 0.90–1.20 |
| D | 20 | 280–300 | 1.00–1.40 |
| E | 14 | 285–300 | 0.70–0.80 |

[1] Spun yarn directly from reactor.
[2] Made film directly from reactor.

The polymerization build-up in the process of this invention is carried out in the liquid phase under a high vacuum to facilitate the removal of the glycol, thus enabling continuous operation. A pressure range from about 0.01 mm. to about 2.5 mm. may be used although it can be up to about 5 cm. The preferred range is from about 0.1 to about 1.0 mm. An advantageous range is 0.5 to 2.5 mm. in the upper zone and 0 to 0.5 in the lower zone, the differential between the two zones being from 0.1 to 2 mm. of Hg. The temperature in the polymerization reactor should not ordinarily exceed 350° C. Although in the above examples titanium catalyst such as the isopropoxide have been employed the process is not limited to the use of any particular catalyst. Other suitable catalysts include those described in United States Patent Nos. 2,465,319, 2,720,502 and 2,727,881; among such catalysts which can be used are zinc acetate, isopropyl titanate, antimony trioxide, manganese propionate, a combination of such catalysts as lithium acetate, sodium hydroxide or both of these with aluminum isopropoxide, manganese acetate and magnesium-titanium butoxide, etc. Titanium dioxide, silica, carbon black, and other similar inorganic pigments may also be included in the reaction mixture as well as stabilizers, antioxidants, dyes, etc.

From the above description it can readily be seen that we have provided a novel process and apparatus for the preparation of polyesters. Any of the polyesters known in the art can be prepared using this invention, i.e. those described in U.S. 2,465,319, U.S. 2,720,502, U.S. 2,901,466, etc.

Although the invention has been described in considerable detail with particular reference to certain preferred embodiments thereof, variations and modifications can be effected within the spirit and scope of the invention as described hereinabove, and as defined in the appended claims.

The embodiment of the invention in which an exclusive property or privilege is claimed are defined as follows:

1. A continuous process for the further polymerization of an intermediate molecular weight polyester of (1) a dicarboxylic constituent and (2) an alkanediol, wherein said molecular weight is being increased by elimination of small amounts of said alkanediol by vaporization and evacuation at an elevated temperature and at a low pressure while said intermediate molecular weight polyester as a liquid flows downwardly through an upper polymerization zone at one pressure into and through a lower polymerization zone at a lower pressure, said zones being in substantially vertical relationship, said intermediate molecular weight polyester having an inherent viscosity measured in a solution of 40% tetrachloroethane+60% phenol of from about 0.05 to about 0.4, said further polymerization process comprising:

(a) feeding said intermediate molecular weight polyester as a liquid into a substantially horizontal initial receiving sub-zone in said upper polymerization zone, said sub-zone being equipped with overflow means leading to a lower sub-zone in said upper polymerization zone which is similarly equipped, (b) overflowing said polyester liquid from one such sub-zone to the next, all of said sub-zones in said upper polymerization zone being at a pressure of less than 5 cm. of Hg and being gaseously interconnected, (c) flowing said polyester liquid downwardly from the lowermost of said sub-zones in said upper polymerization zone through a liquid conducting means to said lower polymerization zone, the liquid level of said polyester liquid in said liquid conducting means being maintained at a level at least as high as is the level of said polyester liquid in an uppermost receiving sub-zone in said lower polymerization zone into which said liquid conducting means protrudes, (d) overflowing said polyester liquid from said uppermost sub-zone in said lower polymerization zone over a series of evaporative surfaces in vertically descending order in said lower polymerization zone whereby said liquid polyester flows as a thin film across the major portion of each surface and drops therefrom upon the next following surface below, all of said surfaces in said lower polymerization zone being gaseously interconnected and maintained at a lower pressure than the pressure maintained in the upper polymerization zone, (e) flowing said polyester from the lowermost of said evaporative surfaces to means for removal from said lower polymerization zone, whereby the resulting further polymerized polyester has an inherent viscosity at least 0.2 greater than that of said intermediate molecular weight polyester being fed into the upper polymerization zone, and (f) maintaining a pressure differential of at least 0.1 m. of Hg between said upper and lower polymerization zones.

2. A process as defined by claim 1 wherein said polyester is the polyester of reactants consisting essentially of terephthalic acid and ethylene glycol.

3. A process as defined by claim 1 wherein said polyester is the polyester of reactants consisting essentially of terephthalic acid and 1,4-cyclohexanedimethanol.

4. A process as defined by claim 1 wherein the upper polymerization zone pressure range is about 0.5–2.5 mm. of Hg, the lower polymerization zone pressure range is about 0–0.5 mm. of Hg and the pressure differential between the two zones is about 0.1–2.0 mm. of Hg.

5. A process as defined by claim 4 wherein said polyester is the polyester of reactants consisting essentially of terephthalic acid and ethylene glycol.

6. A process as defined by claim 4 wherein said polyester is the polyester of reactants consisting essentially of terephthalic acid and 1,4-cyclohexanedimethanol.

7. A process as defined by claim 4 wherein the inherent viscosity of the resulting further polymerized polyester is at least twice that of the intermediate molecular weight polyester.

8. A process as defined by claim 7 wherein said polyester is the polyester of reactants consisting essentially of terephthalic acid and ethylene glycol.

9. A process as defined by claim 7 wherein said polyester is the polyester of reactants consisting essentially of terephthalic acid and 1,4-cyclohexanedimethanol.

References Cited by the Examiner

UNITED STATES PATENTS

| | | | |
|---|---|---|---|
| 2,758,915 | 8/1956 | Vodonik | 260—75 |
| 2,901,466 | 8/1959 | Kibler et al. | 260—75 |
| 3,054,776 | 9/1962 | Higgins | 260—75 |
| 3,157,619 | 11/1964 | Bell et al. | 260—75 |

WILLIAM H. SHORT, *Primary Examiner.*

LOUISE P. QUAST, *Examiner.*